Aug. 18, 1936.    T. STIEBEL    2,051,658
ELECTRICALLY HEATED HOT WATER RESERVOIR
Filed Jan. 9, 1936
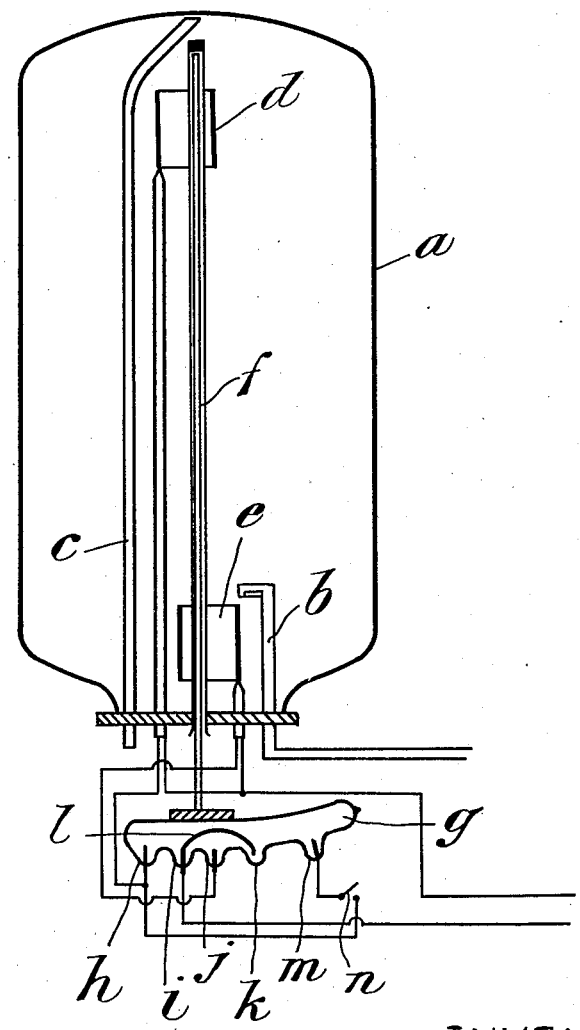
INVENTOR
T. Stiebel
John O. Seifert
Attorney Patented Aug. 18, 1936

2,051,658

UNITED STATES PATENT OFFICE 2,051,658

ELECTRICALLY HEATED HOT WATER RESERVOIR

Theodor Stiebel, Berlin-Tempelhof, Germany

Application January 9, 1936, Serial No. 58,243

7 Claims. (Cl. 219—38)

This invention relates to electrically heated hot water reservoirs of the overflow type having a plurality of immersion heaters located at different heights in the reservoir, and provided with thermostatic devices adapted automatically to control the temperature of the water by making and breaking contacts in the circuit of the heating elements when the temperature of the water in the reservoir falls below or exceeds a predetermined temperature range.

In hot-water reservoirs of this kind it has already been proposed to locate a heating element in the upper part of the reservoir so as to ensure that the water in the upper zone is heated first when only relatively small quantities of hot water are required to be drawn off, and it has also been proposed to provide two heating elements, one arranged in the upper part of the reservoir and one in the lower part, the lower heating element being so controlled by a coarse adjustment thermostat that it preheats the whole content of the reservoir to a certain predetermined temperature, for example 85° C., while the upper heating element is controlled by a precision thermostat in such a manner that the temperature of the water in the upper part of the reservoir is maintained at a temperature just below boiling point.

An object of the invention is to provide an electrically heated hot-water reservoir having two or more heating elements located at different heights in the reservoir and controlled by a single coarse adjustment thermostat which controls a mercury switch arranged in the circuit of the heating elements, said mercury switch operating under the influence of the thermostat, first to close the circuit of the upper heating element and then, when the water in the upper part of the reservoir has reached a given predetermined minimum temperature, switches said upper heating element off and closes the circuit of the lower heating element, and then when the whole content of the reservoir has reached the given predetermined minimum temperature opens the circuit of the lower heating element and again closes the circuit of the upper heating element and finally disconnects all the heating elements when substantially the whole content of the reservoir has reached a predetermined maximum temperature.

With this arrangement the water in the upper part of the reservoir, that is the water which is first drawn off is always maintained at maximum temperature.

According to a further object of the invention a manually operable switch is provided by means of which the mercury switch can, if desired, be prevented from again switching on the upper heating element when the whole content of the reservoir has reached the predetermined minimum temperature, so that by opening the switch the content of the reservoir can be maintained at the minimum temperature instead of at the maximum temperature.

A further object of the invention is to provide means whereby the thermostat operates to switch off the heating current after the water in the upper zone begins to boil but before the whole content of the reservoir reaches boiling point.

The thermostat for controlling the temperature of the water in the reservoir is of the expansion-rod type and extends through almost the whole length of the reservoir in the vicinity of the heating elements and is connected at its lower end to the mercury switch which is of the multiple pole type. The arrangement is such that when the whole content of the reservoir is cold two of the contacts at one end of the mercury switch are bridged thus closing the circuit of the upper heating element, which then heats the water in the upper part of the reservoir. When the water in the upper part of the reservoir has been thus heated to a predetermined minimum temperature, for example 85° C., the mercury switch is tilted slightly, owing to expansion of that part of the thermostat which is in the upper heated zone, whereupon another pair of contacts of the mercury switch are bridged thus breaking the circuit of the upper heating element and closing the circuit of the lower heating element which then heats the water in the lower zone of the reservoir. When the whole content of the reservoir has thus been heated to the predetermined minimum temperature the thermostat, the whole length of which is then influenced by heat, tilts the mercury switch still further whereupon the mercury bridges two further contacts and thus closes a circuit in which a hand operated switch and the upper heating element are arranged. If the hand switch is switched on the upper heating element heats the water (already heated to 85° C.) in the upper zone of the reservoir up to boiling point.

This increase in temperature in the upper zone of course affects the upper end of the thermostat which consequently expands still further and tilts the mercury switch to a still greater inclination, but the adjustment of said mercury switch is such that the further expansion of the upper end of the thermostatic rod, caused by the increased temperature in the upper zone of the reservoir, does not however cause the switch to be tilted sufficiently to cut off the heating current from the upper heating element, thus even when the water in the upper zone of the reservoir reaches boiling point the upper heating element continues to function with the result that the depth of the boiling zone gradually increases, that is to say the so-called separation zone between the boiling water and the water not yet boiling gradually descends.

As the separation zone descends however, a continually greater length of the thermostat is influenced by the increase in temperature, so that the thermostat continues to expand and thus increase the angle of inclination of the mercury switch until in this way the circuit of the upper heating element is broken.

The angle of inclination of the mercury switch at which the heating element is switched off may vary, as may the volume of boiling water when switching off takes place, but the arrangement, construction and adjustment of the mercury switch is such that the current is switched off with absolute certainty before the whole content of the reservoir reaches boiling point but not until after the water in the upper zone of the reservoir has exceeded that temperature. For this purpose the multiple pole mercury switch actuated by the thermostat is adjusted to switch off the current when the temperature of the water in the upper zone of the reservoir exceeds boiling point; that is to say when the depth of the boiling zone has increased sufficiently to affect a greater length of the thermostat than that which extends within the range of the upper heating element, which range constitutes the depth of the initial boiling zone.

Thus although only a coarse adjustment thermostat is employed, the heating current is not switched off until the reservoir contains at least some boiling water, but is switched off with absolute certainty before the whole content of the reservoir boils, by reason of the fact that the mercury switch is tilted to the switching off angle when the zone of boiling water extends to some indefinite point below the range of the upper heating element so as to influence a part of the length of the thermostat below the part extending into the range of the upper heating element, that is the initial boiling zone.

The thermostat and mercury switch operate in the above manner only when the above mentioned hand switch, for controlling the last switching stage of the mercury switch, is closed. If the hand switch is opened then the whole content of the reservoir is heated in stages as described above that is the water in the upper part of the reservoir which is the first to be drawn off is heated to the predetermined minimum temperature (85° C.), and if this volume is not drawn off the remainder of the content is heated to 85° C. when the heating current is switched off. The arrangement of heating elements whereby the upper zone of the reservoir is heated first, enables a quantity of water to be heated in a short period of time so that small quantities of hot water can be drawn off at short intervals. Moreover the provision of the aforesaid hand operated switch has the great advantage that hot or boiling water can be had as desired by merely opening or closing said switch.

An example of apparatus according to the invention is illustrated diagrammatically in the accompanying drawing in which $a$ is the reservoir into the lower part of which cold water is supplied through a pipe $b$, hot water being discharged through an overflow pipe $c$ from the upper part of the reservoir. The reservoir is provided with two ring shaped heating elements $d$ and $e$ and a thermostat $f$ which extends in the longitudinal axis of the reservoir, through the ring shaped heating elements $d$ and $e$, and controls a mercury switch $g$ provided with five contacts $h$, $i$, $j$, $k$, and $m$. The contact $m$ is connected to the upper heating element through a single pole hand switch $n$. The thermostat $f$ is of the kind comprising an outer metal tube which expands longitudinally when heated and a rod of special alloy arranged within said tube. When the outer tube is heated and thus caused to expand the metal rod, which protrudes at the lower end, and to which the mercury switch is attached, preferably by a suitable motion transmitting lever, tilts said mercury switch $g$.

The operation of the device is as follows:—

When the content of the reservoir is cold the position of the mercury switch $g$ is such that the contacts $h$ and $i$ are bridged by the mercury whereby the electric current passes from the mains of the source of electricity by way of contacts $h$, $i$ through the mercury to the upper heating element $d$, by which the water in the upper zone of the reservoir is heated. As the temperature of the water in the upper zone rises the upper end of the thermostat $f$ expands and tilts thus causing the mercury switch $g$ to be tilted. The distance between the contacts and the curvature of the switch is such that after this initial tilting of the switch $g$ the mercury flows over to bridge the two contacts $i$ and $j$, and possibly the contact $k$ also, thereby opening the circuit of the upper heating element $d$ and closing the circuit of the lower heating element $e$ which then heats the water in the lower zone of the reservoir. As the heating of the content of the reservoir thus proceeds the lower part of the thermostat also expands with the result that the mercury switch $g$ is further tilted causing connection between the contacts $i$ and $j$, and thereby the circuit of the element $e$, to be broken, and the contacts $k$ and $m$ to be bridged by the mercury.

If the hand switch $n$ is opened no further heating occurs since both heating elements $d$ and $e$ are disconnected, and if a small quantity of hot water is then drawn off cold water flows into the reservoir through the pipe $b$ and cools the lower end of thermostat which then tilts the mercury switch back to the position in which the circuit of the lower heating element is closed by the mercury bridging the contacts $i$ and $j$, similarly if the whole of the hot water in the reservoir is drawn off the thermostat, influenced by the cold water, will tilt the switch back to its initial position in which it closes the circuit of the upper heating element $d$.

If, when the mercury switch $g$ is in the position in which the contacts $k$ and $m$ are bridged, the hand switch $n$ is closed, the circuit of the upper heating element $d$ is closed and the water in the upper zone of the reservoir is then heated to a still higher temperature. To enable this the contacts $i$ and $k$ are permanently bridged by a conductor $l$ so that when the mercury bridges the contacts $k$ and $m$ it has the effect of bridging the contacts $i$ and $m$. When the water in the upper zone has reached boiling point the upper end of the thermostat will have expanded still further and consequently will have caused the mercury switch to tilt still further, but the upper heating element is not immediately disconnected, since the arrangement and the curvature of the mercury switch is such that the increased heat occurring in the upper zone of the reservoir does not influence the thermostat to such an extent that the contact between k and m is broken, thus the water in the upper zone of the reservoir continues to boil. The boiling zone thus gradually creeps downwards and influences an increasing length of the thermostat with the result that the mercury switch continues to tilt until finally, the contact between k and m is broken and the upper heating element thereby switched off. Thus the arrangement and adjustment of the thermostat and the mercury switch need not be particularly accurate since it is only necessary for the upper heating element to be switched off sometime after the upper water zone has begun to boil and before the whole content of the reservoir reaches boiling point, in other words when the gradually descending boiling zone reaches some point of the thermostat intermediate the upper and lower heating elements.

If boiling water is drawn off, the incoming cold water will influence the thermostat so that the mercury switch will be returned to its initial position, and the circuits of the heating elements will again be closed and opened in the sequence described above and the water will again be brought to boiling point.

What I claim and desire to secure by Letters Patent is:—

1. In a water heater, a water reservoir, a plurality of heating elements located at different heights in said reservoir with one side of each heating element electrically connected to a side of a source of electricity, a thermostat mounted in the reservoir to extend substantially the whole length of the reservoir and in the range of all the heating elements, a multiple contact mercury switch operatively connected to and actuated by said thermostat and electrically connected to the opposite sides of the heating elements and the source of electricity to initially close the circuit of the uppermost heating element, then close the circuit of a lower heating element and open the circuit of the uppermost heating element, and then open the circuit of said lower heating element and close the circuit of the uppermost heating element, and finally open the circuit of the uppermost heating element after the water in the upper zone of the reservoir has begun to boil but before the whole content of the reservoir reaches the boiling point.

2. A water heater as claimed in claim 1, wherein the thermostat comprises an expansible tube and a rod arranged in the tube with an end extending from the tube connected to the switch, and the switch is of curved formation in longitudinal section having a series of five contacts, the first and third contacts of said series of contacts being connected directly to one side of the uppermost and lower heating elements respectively, the last contact of the series being connected to the uppermost heating element, and the remaining two contacts are connected directly to the source of electricity.

3. A water heater as claimed in claim 1, wherein the heating elements are ring shaped and the thermostat passes through said heating elements.

4. In a water heater, a water reservoir, electric heating elements mounted in the reservoir adjacent the bottom and top thereof with one side of each heating element electrically connected to a side of a source of electricity, an electric switch mechanism having a series of fixed contacts and an adjustable contact maker, two of said fixed contacts being connected to the other side of one of the heating elements, one of the remaining fixed contacts connected to the other side of the other heating element and the remaining contacts being connected to the other side of the source of electricity, and a thermostat device mounted in the reservoir to extend substantially the entire length of the reservoir in the range of all of the heating elements and connected to and operative to actuate the switch mechanism to initially adjust the contact maker to close the circuit of one of the heating elements, then open said circuit and close the circuit of the other heating element, and then open the circuit of the second heating element and close the circuit of the first heating element, and finally open the circuit of the first heating element.

5. In a water heater as claimed in claim 4, a manually actuated switch interposed in the electrical connection between one of the fixed contacts of the switch mechanism and the first heating element to control the last energization of said heating element.

6. In a water heater, a water reservoir, electric heating elements mounted in the reservoir, one adjacent the top and the other adjacent the bottom of the reservoir with one side of each of said heating elements connected to a side of a source of electricity, an electric switch mechanism including a series of fixed contacts and a movable contact maker, two of said fixed contacts being connected to the other side of one of said heating elements, one of said fixed contacts connected to the other side of the other heating element, and another of said fixed contacts connected to the other side of the source of electricity, and a thermostat device in the reservoir connected to the switch mechanism and operative when the water in the reservoir is below a predetermined temperature to actuate said switch mechanism to cause the contact maker to close the circuit of one of the heating elements through one of its contacts, then when the water in the region of said heating element rises to a predetermined temperature open the circuit of said heating element and close the circuit of the other heating element through its connected contact, and when the water in the reservoir in the region of said latter heating element rises to a predetermined temperature open the circuit of said second heating element and close the circuit of the first heating element through the second of the contacts connected thereto, and finally when the water in the reservoir rises to a predetermined temperature open the circuit of said first heating element.

7. In a water heater, a water reservoir, electric heating elements in the reservoir adjacent the top and bottom thereof with one side of said heating elements connected to one side of a source of electricity, an electric switch mechanism including a series of fixed contacts connected to the other sides of said heating elements and source of electricity and a movable contact maker operative to close and open the circuits of the heating elements with the source of electricity through said contacts, and a thermostat device in the reservoir connected to and operative to actuate the switch mechanism to cause the movable contact maker to initially close the circuit of the heating element adjacent the top of the reservoir through one of said fixed contacts when the water in the reservoir is below a predetermined temperature, open the circuit of said heating element when the temperature in the region of said heating element rises to a predetermined minimum temperature and close the circuit of the heating element adjacent the bottom of the reservoir through another of the fixed contacts, and then when the water in the region of said latter heating element rises to said predetermined minimum temperature open the circuit of said heating element and close the circuit of the heating element adjacent the top of the reservoir through another one of said contacts, and finally when the water in the reservoir rises to a predetermined maximum temperature open the circuit of said latter heating element.

THEODOR STIEBEL.